United States Patent [19] [11] Patent Number: 4,832,377
Umehara [45] Date of Patent: May 23, 1989

[54] ARRANGEMENT FOR FIXING END OF THIN-WALLED PIPE TO FLANGE COUPLING

[75] Inventor: Kazumasa Umehara, Tagata, Japan

[73] Assignee: Usui Kokusai Sangyo Kabushiki Kaisha, Nagasawa, Japan

[21] Appl. No.: 234,395

[22] Filed: Aug. 19, 1988

Related U.S. Application Data

[63] Continuation of Ser. No. 93,829, Sep. 4, 1987, abandoned.

[30] Foreign Application Priority Data

Sep. 5, 1986 [JP] Japan .............................. 61-136127[U]

[51] Int. Cl.$^4$ .............................................. F16L 13/14
[52] U.S. Cl. .................................. 285/222; 285/382.5; 285/405; 29/523
[58] Field of Search .................. 285/382.5, 382.4, 222, 285/189, 405; 29/523

[56] References Cited

U.S. PATENT DOCUMENTS

| | | | |
|---|---|---|---|
| 2,175,412 | 10/1939 | Rodman | 285/222 |
| 2,217,000 | 10/1940 | Barnes | 285/222 |
| 2,695,446 | 11/1954 | Meyer | 285/382.5 X |
| 3,787,945 | 1/1974 | Pasek et al. | 285/382.5 X |
| 4,142,843 | 3/1979 | Kish | 285/382.5 |
| 4,330,144 | 5/1982 | Ridenour | 285/382.5 |
| 4,390,303 | 6/1983 | Mallet | 29/523 X |
| 4,667,989 | 5/1987 | Bona | 285/382.4 X |

FOREIGN PATENT DOCUMENTS

| | | | |
|---|---|---|---|
| 8348 | of 1889 | United Kingdom | 285/222 |
| 1551816 | 9/1979 | United Kingdom | 285/382.4 |

Primary Examiner—Thomas F. Callaghan
Attorney, Agent, or Firm—Anthony J. Casella; Gerald E. Hespos

[57] ABSTRACT

An improved fixing arrangement includes a planar flange having a mounting hole formed through an axial portion thereof, a radially expanded portion being formed in a portion of the peripheral surface of the mounting hole for receiving an annular resilient sealing member; and a pipe having one end provided with an pipe-diameter portion and a radially expanding annular portion. The radially expanding annular portion is engaged with the peripheral edge of the mounting hole which is formed on the back side of the flange to insert the pipe-diameter portion into the mounting hole. In addition, within the mounting hole, the end of the pipe-diameter portion is enlarged or a part of the pipe-diameter portion is radially expanded to press the resilient sealing member and to clamp the radially inwardly projecting peripheral edge of the mounting hole between the radially expanded portion and the enlarged end or radially expanded end portion, thereby fixedly connecting the flange and the pipe.

7 Claims, 1 Drawing Sheet

ARRANGEMENT FOR FIXING END OF THIN-WALLED PIPE TO FLANGE COUPLING

This application is a continuation of Application Ser. No. 093,829, which was filed on Sept. 4, 1987 and now abandoned.

BACKGROUND OF THE INVENTION

1. Field of the Invention

The present invention relates generally to an improved arrangement for fixedly connecting a flange coupling and an end of a thin-walled metal pipe of the type which has a relatively small diameter of approximately 50 mm or less and a wall thickness of approximately 2 mm or less and which is typically employed in an automobile, various kinds of machines and equipment in the form of a supply pipe through which oil or air is supplied.

2. Description of the Prior Art

Referring to FIG. 3 showing a prior art arrangement of this kind, a planar flange 11 has an mounting hole 12 formed through an axial portion thereof, and an end $P_1'$ of a pipe $P_1$ is inserted into the mounting hole 12. In this state, the flange 11 is fixed to the pipe $P_1$ by heat brazing, as at 13, using a brazing metal material such as copper or brass.

Typically, the thickness of the flange 11 remarkably differs from that of the pipe $P_1$. Therefore, in the prior art fixing arrangement, a deterioration may occur in the mechanical properties of the brazed portion 13 of the pipe $P_1$ due to localized overheating which may be caused, as by an inexperienced operator during a heat brazing operation employing a burner or the like. This deterioration may cause the formation of a crack or a breakage in combination with vibration applied to a piping including the pipe $P_1$ while it is being used. Also, the brazing material may run on a mounting sheet surface of the flange 11 by brazing heat. In addition, since the entire surface of a product is subjected to anti-corrosive plating after the aforesaid brazing operation, there is a problem in that the quality of corrosive resistance may deteriorate.

SUMMARY OF THE INVENTION

It is therefore an object of the present invention to provide an improved fixing arrangement including a flange having a mounting hole provided with an radially enlarged portion in which a resilient sealing member is inserted and a pipe having an end portion provided with an radially expanded portion, the end portion being inserted into the mounting hole such that the radially expanded portion is engaged with the back of the flange. In addition, the end of the pipe is enlarged or a portion of the end portion of the pipe is radially extended to press the resilient sealing member and to clamp a radially inwardly projecting peripheral edge of the mounting hole between the radially expanded portion and the enlarged end or radially extended end portion, thereby fixedly connecting the flange and the pipe. This eliminates the previously-described heat brazing and prevents a crack or breakage from being formed by a deterioration in the mechanical properties of the fixed portion of the pipe as well as various troubles from occurring due to a brazing material running on the mounting sheet surface of the flange by brazing heat. In addition, it is possible to use previously-plated flange and pipe, thereby remarkably improving the efficiency of fixing operation.

To this end, the present invention provides an improved fixing arrangement for fixedly connecting one end of a thin-walled metal pipe and a flange coupling. The improved fixing arrangement includes a planar flange having a mounting hole formed through an axial portion thereof, a radially expanded portion being formed in a portion of the peripheral surface of the mounting hole for receiving an annular resilient sealing member; and a pipe having one end provided with an pipe-diameter portion and a radially expanding annular portion. The radially expanding annular portion is engaged with the peripheral edge of the mounting hole on the back side of the flange to insert the pipe-diameter portion into the mounting hole. In addition, within the mounting hole, the end of the pipe-diameter portion is enlarged or a part of the pipe-diameter portion is radially expanded to press the resilient sealing member and to clamp the radially inwardly projecting peripheral edge of the mounting hole between the radially expanded portion and the enlarged end or radially extended end portion, thereby fixedly connecting the flange and the pipe. The radially expanded portion may be formed in a groove-like or step-like shape.

Further objects, features and advantages of the present invention will become apparent from the following description of preferred embodiments of the present invention with reference to the accompanying drawings.

DESCRIPTION OF THE PREFERRED EMBODIMENT

Figure 1:
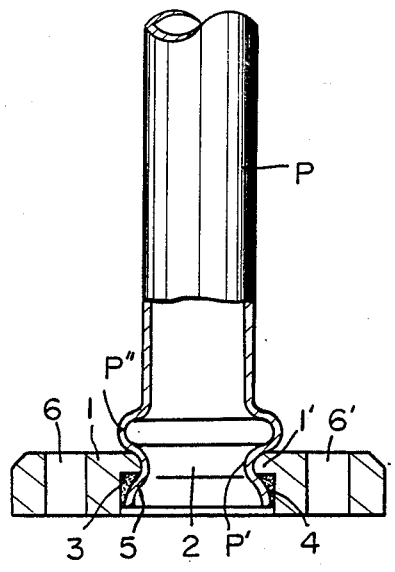
FIG. 1 is a partially cutaway, plan view of a first preferred embodiment of the present invention showing an arrangement for fixing one end of a thin-walled metal pipe to a flange coupling.

Preferred embodiments of the present invention will be described below with reference to FIGS. 1 and 2. FIG. 1 is a partially cutaway, plan view of a first preferred embodiment of the present invention showing an arrangement for fixing one end of a thin-walled metal pipe to a flange coupling and FIG. 2 is a view similar to FIG. 1 showing a second preferred embodiment of the present invention.

Figure 2:
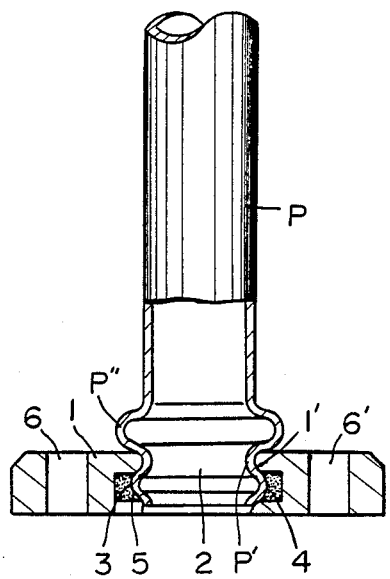
FIG. 2 is a view similar to FIG. 1 showing a second preferred embodiment of the present invention.
Figure 3:
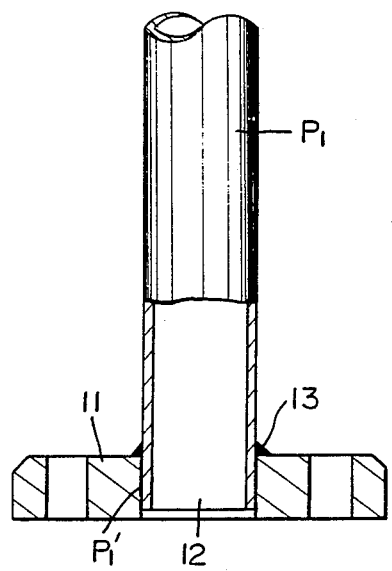
FIG. 3 is a partially cutaway, plan view of a prior art fixing arrangement.

Referring to FIGS. 1 and 2, an planar flange 1 is of the type produced by forging, casting or punching of a steel material. The planar flange 1 has a mounting hole 2 formed through an axial portion thereof, and the mounting hole 2 has a peripheral surface including an radially expanded portion 3 and an radially inwardly projecting peripheral edge 1'. An annular resilient sealing member 4 made of a rubber or resin material is fitted in the radially expanded portion 3. A pipe P has one end portion provided with an pipe-diameter portion P' and an radially expanded portion P'' having an annular form. The radially expanded portion P'' is engaged with the surface of the radially inwardly projecting peripheral edge 1' of the mounting hole 2 which is exposed on the back of the flange 1 to insert the pipe-diameter portion P' into the mounting portion 2. Within the mounting hole 2, the pipe-diameter portion P' is enlarged at its end (FIG. 1) or partially radially expanded by pressing or buckling (FIG. 2) to press the resilient sealing member 4 against the wall of the enlarged portion 3 and at the same time to clamp the radially inwardly projecting peripheral edge 1' of the mounting hole 2 between the radially expanded portion P" and the FIG. 1 enlarged portion or the FIG. 2 radially expanded portion of the pipe-diameter portion P', thereby fixedly connecting the planar flange 1 and the pipe P. Incidentally, reference numerals 6 and 6' respectively denote holes receiving bolts secured to a base (not shown).

It is to be noted that the radially expanded portion 3 may be formed in the peripheral surface of the mounting hole 2 in a stepped shape (FIG. 1) or in a groove-like shape (FIG. 2).

In accordance with the present invention including the above-described arrangement, the pipe-diameter portion P' of the end portion of the pipe P is fitted into the mounting hole 2 having the radially expanded portion 3 in which the resilient sealing member 4 is fitted, and the pipe-diameter portion P' is enlarged at its end or a part of the same is radially expanded to press the resilient sealing member 4 against the wall of the radially expanded portion 3. In addition, the radially inwardly peripheral edge 1' of the mounting hole 2 is clamped between the radially expanded portion 3 and the enlarged end or radially expanded portion, thereby airtightly and firmly fixing the pipe P to the flange 1.

As described above, in the arrangement for fixing a thin-walled metal pipe to a flange coupling in accordance with the present invention, the pipe P is fixedly connected to the flange 1 by a pressure applied to the resilient sealing member 4 by the radially outwardly expanded portion 3 and by a clamping force acting upon the radially inwardly projecting peripheral edge 1' of the mounting hole 2 between the annularly expanded portion P" and the radially enlarged end or the radially expanded portion 5. Therefore, it is possible to eliminate a fixed portion which is heat-brazed, and this prevents various troubles from occurring on the mounting sheet surface of the flange 1 due to the formation of a crack, breakage or flowing of a brazing material owing to a deterioration in the mechanical properties of the fixed portion of the pipe P. In addition, the flange 1 and the pipe P which are previously plated may be used so that the efficiency of a mounting operation may be improved, thereby achieving a remarkably useful arrangement for fixing an end of a thin-walled metal pipe in a flange coupling.

While this invention has been described in conjunction with specific embodiments thereof, it is evident that many alternatives, modifications and variations will be apparent to those skilled in the art. Accordingly, it is intended to emrace all such alternatives, modifications and variations as fall within the spirit and broad scope of the appended claims.

What is claimed is:

1. An arrangement for fixedly connecting an end of a thin-walled metal pipe to a flange coupling comprising in combination:
a planar flange having opposed front and back faces, a mounting hole formed entirely through said flange from the front to the back faces thereof, a radially expanded portion formed in a portion of the peripheral surface of said mounting hole spaced from both said front and back faces, such that portions of said mounting hole adjacent said front and back faces define radially inwardly projecting portions having smaller cross sections than said radially expanded portion, and an annular resilient sealing member inserted in said radially expanded portion and between said radially inwardly projecting portions; and
a pipe extending into said mounting hole of said flange, said pipe having a first annularly expanded portion engaged with the portion of the back face of said flange adjacent said mounting hole and a second annularly expanded portion spaced from said first annularly expanded portion and disposed in the radially expanded portion of the mounting hole of said flange, said second annularly expanded portion of said pipe being dimensioned to press said resilient sealing member against the inner walls of said radially expanded portion of said mounting hole and to clamp said first annularly expanded portion of said pipe against the back face of said flange adjacent said mounting hole.

2. An arrangement as in claim 1 wherein the first annularly expanded portion of said pipe defines a larger diameter than the second annularly expanded portion thereof.

3. An arrangement as in claim 1 wherein said radially inwardly projecting portions of said mounting hole in said planar flange defined substantially equal diameters.

4. An arrangement as in claim 1 wherein said annularly expanded portions are spaced from the end of said pipe.

5. An arrangement as in claim 1 wherein said annularly expanded portions of said pipe are spaced from the end of said pipe, and wherein the end of said pipe is disposed intermediate the front and back faces of said mounting hole.

6. An arrangement as in claim 1 wherein portions of said pipe disposed on opposite longitudinal sides of said second annularly expanded portion are engaged respectively with the radially inwardly projecting portions adjacent said front and back faces of said planar flange.

7. An arrangement for fixedly connecting an end of a thin-walled metal pipe to a flange coupling for use in an environment subject to vibration, said arrangement comprising:
a planar flange having opposed front and back faces and a mounting hole formed entirely therethrough, from the front face to the back face thereof, said mounting hole being characterized by a radially expanded portion disposed intermediate said front and back faces, such that said mounting hole is characterized by inwardly projecting portions of substantially equal diameters disposed on opposite sides of said radially expanded portion and adjacent the front and back faces;
an annular resilient sealing member disposed in said radially expanded portion of the mounting hole through said planar flange; and
a pipe having one end disposed in said mounting hole of said flange, said pipe comprising a first annularly expanded portion engaged with the back face of said flange adjacent said mounting hole and a second annularly expanded portion spaced from both said first annular expanded portion and from the end of said pipe, said second annularly expanded portion of said pipe being disposed in the radially expanded portion of said mounting hole such that said second annularly expanded portion urges said resilient sealing member against the walls of said radially expanded portion, said second annularly expanded portion being disposed and dimensioned to engage both said inwardly projecting portions in the mounting hole of said flange to thereby clamp said first annularly expanded portion of said pipe against the back face of said flange.

* * * * *